(12) United States Patent
Johannessen et al.

(10) Patent No.: US 9,376,348 B2
(45) Date of Patent: Jun. 28, 2016

(54) METHOD FOR MAKING A DENSE SIC BASED CERAMIC PRODUCT

(71) Applicant: SAINT-GOBAIN CERAMIC MATERIALS AS, Lillesand (NO)

(72) Inventors: Vidar Johannessen, Kristiansand (NO); Jostein Mosby, Mosby (NO)

(73) Assignee: SAINT-GOBAIN CERAMIC MATERIALS AS, Lillesand (NO)

( * ) Notice: Subject to any disclaimer, the term of this patent is extended or adjusted under 35 U.S.C. 154(b) by 222 days.

(21) Appl. No.: 14/351,036

(22) PCT Filed: Oct. 12, 2012

(86) PCT No.: PCT/EP2012/070264
§ 371 (c)(1),
(2) Date: Apr. 10, 2014

(87) PCT Pub. No.: WO2013/053892
PCT Pub. Date: Apr. 18, 2013

(65) Prior Publication Data
US 2014/0327163 A1 Nov. 6, 2014

(30) Foreign Application Priority Data
Oct. 13, 2011 (NO) .................................... 20111389

(51) Int. Cl.
| C04B 35/565 | (2006.01) |
| C04B 35/626 | (2006.01) |
| C04B 35/634 | (2006.01) |
| B01D 1/18 | (2006.01) |

(52) U.S. Cl.
CPC ............... *C04B 35/565* (2013.01); *B01D 1/18* (2013.01); *C04B 35/6261* (2013.01); *C04B 35/62655* (2013.01); *C04B 35/62695* (2013.01); *C04B 35/634* (2013.01); *C04B 2235/3821* (2013.01); *C04B 2235/3826* (2013.01); *C04B 2235/48* (2013.01); *C04B 2235/5436* (2013.01); *C04B 2235/5445* (2013.01); *C04B 2235/668* (2013.01); *C04B 2235/72* (2013.01); *C04B 2235/77* (2013.01); *C04B 2235/96* (2013.01); *Y10T 428/2982* (2015.01)

(58) Field of Classification Search
None
See application file for complete search history.

(56) References Cited

U.S. PATENT DOCUMENTS

| 4,124,667 A * | 11/1978 | Coppola ............... C04B 35/565 |
| | | 264/29.5 |
| 4,124,734 A | 11/1978 | Alterman et al. |
| 4,524,138 A | 6/1985 | Schwetz et al. |
| 4,701,427 A | 10/1987 | Boecker et al. |
| 4,756,482 A | 7/1988 | Matje et al. |
| 2003/0195122 A1 | 10/2003 | Demendi et al. |
| 2006/0019816 A1 | 1/2006 | Lynen et al. |
| 2011/0028301 A1* | 2/2011 | Vargas-Gonzalez C04B 35/5755 |
| | | 501/90 |
| 2011/0175264 A1* | 7/2011 | Pujari .................... B82Y 30/00 |
| | | 264/625 |

FOREIGN PATENT DOCUMENTS

| CN | 101104560 A | 1/2008 |
| DE | 41 24 734 A1 | 1/1993 |
| EP | 0 219 933 A2 | 4/1987 |
| GB | 1 533 675 | 11/1978 |
| JP | S61-287433 A | 12/1986 |
| JP | 01-308876 | 12/1989 |
| JP | 2001-139376 | 5/2001 |

OTHER PUBLICATIONS

Routschka, G. & Wuthnow, H. (Editors), Refractory Materials, Pocket Manuel, Design Properties Testing, 3rd Edition, © 2008 Vulkan-Verlag GmbH.
International Search Report as issued for International Application No. PCT/EP2012/070264, dated Dec. 5, 2012.

* cited by examiner

*Primary Examiner* — Mary F Theisen
(74) *Attorney, Agent, or Firm* — Pillsbury Winthrop Shaw Pittman LLP

(57) ABSTRACT

A process for obtaining granules for manufacturing a silicon carbide based sintered product, includes a) mixing a powder of silicon carbide SiC particles, whose average diameter $d_{50}$ is at least about 2 micrometers with a powder of a boron compound particles, whose average diameter $d_{50}$ is at least about 2 micrometers, the SiC particles content being more than 90% by weight of the powder mixture; b) co-milling the powder mixture until the overall average diameter $d_{50}$ of the resulting particles is between 0.3 and 1 micrometers; c) chemically treating the powder mixture by base solution and acid wash; d) mixing the powder mixture of c) with 1 to 10% by weight, based upon the silicon carbide content, of a carbon containing resin having a water miscibility of more than 10:50, as measured according to the ISO8989 standard, and e) spray-drying the resulting mixture of d), to generate the granules.

24 Claims, No Drawings

METHOD FOR MAKING A DENSE SIC BASED CERAMIC PRODUCT

CROSS-REFERNCE TO RELATED APPLICATIONS

This application is the U.S. National Stage of PCT/EP2012/070264, filed Oct. 12, 2012, which in turn claims priority to Norwegian Application No. 20111389, filed Oct. 13, 2011. The content of both applications are incorporated herein by reference in their entirety.

The present invention relates to the field of dense materials essentially made from silicon carbide (SiC), in particular made by a pressureless sintering method starting from shaped silicon carbide-based granules.

More particularly, the invention relates to a method for fabricating homogeneous SiC-based granules which can be used for the manufacture of dense material product of any form by a pressureless sintering process.

Such a body or element can notably be used in the field of advanced ceramics, monolithic or composites, as for example components of furnaces, of engine or turbines, kiln furniture, igniters, bricks, blocks tubes or plates, crucibles, wear resistant and/or corrosion resistant components in particular for chemical or metallurgical applications.

Ceramics or refractory materials made from silicon carbide obtained by sintering at high temperature are increasingly used in applications where their high chemical inertia and their high refractoriness allow them to withstand high mechanical stresses or thermo-mechanical stresses.

It is known that the properties of sintered bodies depend to a great extent on the nature of the starting powders used for the manufacture of the sintered bodies by known powder metallurgy processes. For example, for the pressureless sintering of a mixture of silicon carbide and boron carbide or carbon and boron, it is widely thought that the initial mixture of some very fine starting powders is necessarily required. The powders must meet certain requirements not only with regard to particle size and particle size distribution but also with regard to content of impurities. Such powders must be sinterable to a required degree and substantially free of foreign substances which may interfere with the sintering process or lead to undesirable foreign substances in the finished sintered body.

The silicon carbide powders used in the instant method are generally produced by the Acheson process. This process is widely used to prepare sinterable silicon carbide, for economic reasons and because of its readier availability. Silicon carbide produced by the Acheson process, because of the high manufacturing temperatures required in the process, consists mainly of the thermodynamically more stable alpha modification.

Silicon carbide powders can therefore be obtained in the required fineness by intensive grinding of compact grains obtained from industrial SiC production.

Several methods were previously described to manufacture bodies from silicon carbide-based granules using a pressureless sintering process:

The publication US 2003/195122 (also called herein "US-122") discloses a ceramic processing using granules for manufacturing a ceramic body of SiC comprising a carbon compound and a boron compound additives as sintering aids. A SiC pressureless composite is produced according to US-122, which is useful in rubbing applications. The steps for producing the composite body includes forming a mixture of silicon carbide with a binderless, allotropic carbon yielding precursor granules, then shaping and heating the mixture to obtain the desired sintered body.

The level of carbon in the granules and in the final product as required in this document is however very high. The final composite body of SiC according to US-122 comprises allotropic carbon granules in the size of 5-500 micrometers which counts until up to 35% of the total weight. Such an amount of free carbon results however in weak mechanical properties for the final composite body.

US 2006/0019816 (also called herein "US-816") discloses also a similar process wherein the slurry is prepared by milling simultaneously SiC feed stock and composite granules containing non graphitic carbon with a carbon yielding binder. The additional use of sub-micrometer boron carbide particles is mentioned as an additional sintering aid for the pressureless self-sintering process, in a concentration from 0.5 to 2.0% by weight. Once more, due to their great amount of residual free carbon and the size of the residual carbon particles, the final bodies obtained from the disclosed process do not show a high resistance to the mechanical stress.

There exists therefore a need for a method which leads to the manufacture of products or bodies formed by a dense material obtained by a pressureless sintering of granules made essentially from SiC, and which exhibits yet a high mechanical resistance.

It has been discovered through the experiments carried out by the applicant that it is possible to obtain granules depleted in free carbon (i.e comprising less than about 2.5% by weight of free carbon) which can lead to high mechanical resistance SiC-based products by the pressureless sintering technique, provided that the dispersion of the boron compound within the granules fulfills some very specific conditions. By "high mechanical strength" it is meant strength of at least 500 MPa, more preferably at least 550 MPa as measured by a 4 point bending test according to the ASTM C1161-02.c standard.

It was discovered more particularly that the boron particles tend to agglomerate in the granules and further that a high mechanical strength of the final product (i.e. the product obtained by the pressureless sintering of the granules) can only be reached if agglomerates of the boron containing compound, more particularly $B_4C$ particles, can be avoided to a certain extent within the granules.

The experiments made by the applicant showed more particularly that such kind of granules can only be obtained using a process that comprises the following steps:
- co-milling typically in a water-based slurry a mixture of a powder of SiC and a powder of $B_4C$, each initial powder having a selected initial particle size distribution;
- implementing the co-milling until a selected particle size distribution of the global mixture is reached,
- chemically treating the mixture to remove the impurity contents incurred by the raw materials and co-milling such as metallic silicon, silica, iron and aluminum,
- mixing the $SiC/B_4C$ powder mixture resulting slurry with a carbon precursor, which is a carbon containing resin, preferably with a temporary binder and possibly a lubricant,
- spray drying of the resulting mixture so as to generate said granules.

The bodies or element according to the invention are further obtained by the pressureless sintering, under a non-oxidizing atmosphere, starting from the shaped previous granules in the required forms and at a sintering temperature in the range between 2000° C. and 2400° C., preferably between 2000° C. and 2200° C.

More precisely, the invention relates first to a process for the obtaining of granules useful for the manufacture of a silicon carbide based sintered product, comprising the following steps:
a) mixing a first powder of silicon carbide SiC particles, whose average diameter $d_{50}$ is about 2 micrometers or more than 2 micrometers with a second powder of boron compound particles, more particularly boron carbide particles, whose average diameter $d_{50}$ is also about 2 micrometers or more than 2 micrometers, the SiC particles content being more than 90% by weight of said powder mixture,
b) co-milling the mixture of SiC and boron compound particles until the overall average diameter $D_{50}$ of the resulting particles size is between 0.3 and 1 micrometers,
c) chemically treating the mixture at least by a base solution such as NaOH and then an acid wash,
d) mixing of the powder mixture coming from step c) with 1 to 10% by weight, based upon the silicon carbide content, of a carbon containing resin, preferably with a temporary binder which water miscibility is preferably higher than 10:50 and possibly a lubricant,
e) spray-drying of the resulting mixture from step d), so as to generate said granules.

The chemical treatment of step c) is implemented so as to remove residues from raw materials and co-milling and so that the total amount of impurities is less than 2% by weight, based upon the silicon carbide content. By impurities it is meant the low remaining amounts of Silicon metal (Si), silica ($SiO_2$), iron (Fe) and Aluminum (Al) which is located mainly on the grains surface.

In particular, the amount of Iron measured by ICP analysis ("Inductive Coupled Plasma mass spectroscopy" according to XP ENV 955-4 (1997) is preferably less than 150 ppm and free silica measured by ANSI B74.15-1992-(R2007) is less than 1.5%.

Water miscibility of the carbon containing resin according to the invention is preferably more than 10:100.

By the wording "water miscibility", it is meant the solubility of resin in water. Determination of water miscibility is measured according to the instant invention by the standard test method 1S08989—"Liquid phenolic resins—Determination of water miscibility".

A powder is constituted of grains or particles as individual solid substances. Conventionally, the "average particle size or diameter" called "$D_{50}$" of a powder is the size in microns for which, 50% by volume of the grains or particles have a size of $D_{50}$ or more and 50% by volume of the grains have a size of strictly less than $D_{50}$. Such $D_{50}$ is obtained from the cumulative granulometric distribution curve of the grain sizes of the powder which is applied to the granulometric distribution curve measured typically by a laser diffraction scattering method providing:
up the ordinate, percentages such that a percentage of p % represents the fraction of the powder having p %, by volume, of larger sized grains; and
along the abscissa, the grain sizes Dp, Dp being the smallest possible grain size in the powder fraction represented by the percentage p % along the abscissa.

Other preferred embodiments of the instant process according to the instant invention are given in the attached claims.

The instant invention relates also to the above mentioned composite granules which can be obtained by the previous process. The granules are formed by an inorganic part comprising essentially silicon carbide particles and boron compound particles such as boron carbide B4C and by an organic part comprising at least a carbon containing resin, the inorganic particles being scattered in said resin. The granules according to the invention are characterized by the following features:
an average size between 20 and 2000 microns,
a silicon carbide (SiC) content of more than 80% by weight and less than 99% by weight,
a free carbon content of at most 3% by weight,
a boron content of between 0.5 to 3% by weight,
said boron being scattered in the granules so that the boron compound arises within the resin as agglomerates whose equivalent diameter is at most 5 micrometers.

According to preferred embodiments of the granules features:
The average size of the granules is preferably from 50 to 1000 microns, or even preferably from 80 to 300 micrometers.
The silicon carbide (SiC) content is more than 85% by weight and more preferably more than 88% by weight.
The silicon carbide (SiC) content is less than 95% and even less than 92% by weight.
The free carbon content is at most 2.5% by weight
The overall Fe content is less than 100 ppm by weight, based upon the SiC content.

By "average size of the composite granule", it is meant the mean value between the minimal and maximal dimensions of the granule. These dimensions may be measured classically by optical observations and image analysis.

By "free carbon", it is meant the carbon which is not engaged in a strong chemical bond within a crystal structure such as in SiC or B4C particles for example. It means principally, inside the instant granules, the carbon which originates from the resin and temporary binders or the lubricants. This free carbon is measured according to the ANSI 74-15-1992-(R2007) standard.

The equivalent diameter of the agglomerates comprising Boron compounds is determined as follows: Photographs of granules cross sections are subsequently taken by an electronic scanning microscope in order to evaluate a sample representative of the population of granules. The Boron agglomerates or spots are identified thanks to EDS technique (Energy Dispersive Spectrometry). Thus the raw images of the granules are processed by a known technique in such a manner that the noise pixels are eliminated from the photographs. The equivalent diameter of the agglomerates comprising Boron compound is measured by using conventional image software. The equivalent diameter Di is the diameter of the disk D having an area equal to the area Ap of an agglomerate S, as detected on cross section photographs of the granules.

Other preferred embodiments of the granules according to the instant invention are given in the attached claims.

The instant invention relates also to the product manufactured by a pressureless heat treatment of the above mentioned granules, under a sintering temperature of between 2000 and 2400° C., preferably between 2000 and 2200° C.

Advantageously, the average size $D_{50}$ of the particles of the first SiC powder and the second boron carbide powder (preferably $B_4C$, but not limited thereto) are both in the order of 4 micrometers, for example between 3 and 5 microns, but it is possible according to the invention to use coarser particles. Staying within the scope of the invention, the average size of the particles of the first SiC powder and second boron compound (B4C) powder may be for example of the order of a few tens of microns, or even of the order of a few microns, especially from 3 to 30 microns.

According to one advantage of the instant process, it is required to use relatively coarse $B_4C$ powder that is particles with a $d_{50}$ higher than several microns. This is economically very advantageous because finer powder is costly. On the other hand, high levels of oxygen were produced as impurities in the final mixture when finer $B_4C$ particles are directly mixed with the SiC particles. The removal of this free oxygen then requires a thorough chemical treatment and/or large carbon compound addition (through resin and carbon containing organic additives like binders or lubricants) in order to vaporize silica during the final sintering step. The risk of defect in the ceramic product is then increased.

The co-milling of the SiC and $B_4C$ particles according to the invention (step b) is preferably operated in a conventional attrition mill, although any other known technique may also be used. Very importantly, the co-milling is continued until the $d_{50}$ value of the mixed particles is between 0.3 and 1 micrometers and more particularly around 0.5 micrometer, for example from 0.4 to 0.6 micrometers. It has been discovered that the respect of this particular range of particle size appears essential to achieve the expected mechanical properties of the final sintered product. If the average size of the particles is out of the preceding range (i.e. higher or lower), it has been discovered that the mechanical properties of the final product are much lower.

The chemical treatment according to the instant invention (step c) implies the use of a Brönsted acid such as the sulphuric acid $H_2SO_4$ after the treatment with a basic solution.

Preferably, a water slurry of the mixed SiC and boron compound powder is first heated to a temperature proximate to 80° C., then a basic compound such as NaOH is first added and thereafter the acid compound is used to decrease the pH.

The slurry is then press-filtrated. The conditions of the step c) are matched so that the total amount of impurities (comprising Silicon metal(Si); silica ($SiO_2$); iron metal (Fe) and surface Aluminum metal (Al)) is less than 2% by weight and more preferably less than 1% by weight, based upon the silicon carbide content.

Typically, the carbon containing resin used for the fabrication of the granules during step d) is preferably a phenolic resin and most preferably a resole phenolic resin.

The concentration of the carbon containing resin is preferably in the range of 2% to 10% by weight, based upon the silicon carbide content, and more preferably in the range of between 3% to 8% by weight.

Any resin that includes any suitable carbon precursors, such as carbon-containing organic compounds (e.g., phenolic resins), and elemental carbon (carbon black or graphite) can also be used within the scope of instant invention. The carbon-containing organic compound forms carbon when coked at temperatures of up to about 1,000° C. More preferably, the carbon precursor decomposes at a temperature in a range of between about 100° C. and about 900° C. Examples of such carbon precursors include phenolic resins, more particularly resole phenolic resins, and phenolformaldehyde condensation products of phenolic resins.

Among all these that can be potentially used, the resole phenolic resins are preferred according to the invention because very high strengths were measured from the final product, when such resins were initially chosen as the carbon containing product. Moreover, such resins can exhibit very high water solubility. The inventors have discovered that high water solubility, in the sense previously described, results in improved carbon dispersion in the formed granules.

A temporary binder is also preferably used during step d) so as to facilitate the powder compaction process. The binder is chosen among the organic compound such as polyvinyl alcohol, acrylic resin, mono-ethylene glycol, polyethylene glycol. The concentration of this additive is in the range of 0.5% to 8% by weight, based upon the silicon carbide content, preferably 2% to 6% by weight. Other processing additives could be used during step d) like lubricants or wetting agents, in particular stearic acid and/or oleic acid.

The inorganic powders (SiC and boron compound) and the organic additives are preferably mixed with an intensive mixer.

Typically, step e) for the obtaining of the granules can be implemented preferably by atomization or another process involving a pulverization through at least one nozzle of the mixture resulting from step d) inside a container into which a jet of hot air or of inert gas under pressure is blown, in such a manner as to obtain uniform the granules formed by aggregates of the different grains of ceramic powder coated with the organic products.

The shaping of the final product starting from the granules is preferably performed in such a manner as to form objects of various shapes according to any known technique, for example by pressing, extrusion, vibration and/or molding, by casting—under pressure or otherwise—for example in a porous plaster or resin mold. The size of the granules is adapted according to the techniques currently used to the thickness of the object to be formed in such a manner as to ensure the properties of mechanical resistance and of aspect required for the desired application.

A heat treatment of the shaped product is performed in order to carbonize the organics (resin and binders or lubricants). The heat treatment is preferably performed under no-oxidizing atmosphere, preferably Argon and at a temperature preferably lower than 1000° C., in such a manner as to ensure a sufficient mechanical strength prior to the sintering process and to avoid an uncontrolled oxidation of the SiC.

The heat treatment comprises or is followed by a step of sintering which is carried out under no additional pressure at high temperature, in other words at a temperature higher than 2000° C. but lower than 2400° C. to avoid the decomposition of SiC, preferably between 2000° C. and 2200° C. Preferably, said heat treatment is conducted under a non-oxidizing atmosphere, for example of Argon.

The advantages previously described are illustrated by the non-limiting examples that follow, illustrating certain embodiments of the invention. The following examples allow a comparison to be made with the products obtained according to the prior art and comparative processes.

EXAMPLE 1 (ACCORDING TO THE INVENTION)

A raw batch of a mixture of 98.8% by weight of a silicon carbide powder and 1.2% by weight of a boron carbide powder is milled in a conventional attrition mill in a water-based slurry. The average diameter $D_{50}$ of both starting powders is about 4 micrometers. The co-milling process is continued five days, so that the average particle size of the particles mixture is decreased to 0.5 micrometer.

The resulting slurry powder mixture (50% by weight water) undertakes then a chemical treatment to remove the impurities and the attrition residues. The treatment comprises an initial heating at 80° C. of the mixture which is then treated first by a NaOH basic solution and second by an acidic solution of $H_2SO_4$ to decrease the pH.

After the chemical treatment, the resulting slurry is filtered.

The resulting particles size and $D_{50}$ were measured by laser diffraction particle analyzer (Malvern) before the mixing with the resin and other organics.

An organic composition of a phenolic resin and polyethylene glycol (PEG) and PVA binders is added to the slurry. The Lubricant is added. The whole is intensively mixed using a high shear mixer.

The liquid water based phenolic resin is a resole type Bakelite® PF0435 FW01 supplied by Hexion. This resin used for this example had a water miscibility of 10:150 measured according to the ISO 8989 standard. The measurement on the resin was performed just before mixing.

Granules are then obtained from the resulting composition by spray drying using an atomizer apparatus. The resulting slip is adjusted to a pH of 8-8.5 by adding a Sodium Hydroxide solution before spray-drying. This specific pH range allows getting the optimum viscosity for the slip. Slip is atomized in the chamber in the spray-dryer by a pressure nozzle system working at roughly 60 bars. The pressure nozzle is 0.5 mm diameter. Pressure is adjusted slightly up or down to reach the desired D50 average size of 100 microns for the granules. The outlet temperature of the industrial spray-dryer is set so that the residual humidity of the granules is between 0.5-1%. The inlet temperature is automatically adjusted by the program to keep the set outlet temperature. Outlet temperature is normally in the range from 50-600, and inlet air temperature 150-170° C.

The granules produced are of virtually spherical shape and have an average size of around 100 μm.

The granules were analysed and their internal characteristics are summarized in the table 1 which follows, together with the main process parameters which lead to their fabrication.

The granules are characterized by a specific dispersion of the $B_4C$ particles therein. More particularly, scanning electron microscopy photographs on a cross section of the granules showed no agglomerates of the $B_4C$ particles with a size (equivalent diameter) higher than 2 micrometers.

Finally the granules were shaped to form tiles. Tiles were fired at 2110° C. and fired tiles where cut to bars with dimensions roughly 3.2 mm×4.2 mm×47 mm.

Bars are then machined as close to 3 mm×4 mm×45 mm. as possible with 600 grits and are then suitable for strength testing.

The mechanical properties of the resulting bars of dense SiC material were measured using a cold bending four point strength test according to the ASTM C1161-02.c standard.

The general conditions of example [1] and the main results of the tests were reported in tables 1 and 2 below. The tests showed that the mechanical strength of the final product is around 575 MPa.

TABLE 1

Granules processing

| | |
|---|---|
| Co-milling B4C + SiC powder | 1.2% $B_4C$ ($D_{50}$ about 4 microns) + 98.8% SiC ($D_{50}$ about 4 microns) co-milled 5 days |
| Chemical treatment to remove Si, SiO2, Fe and Al | First heated to 80 C. with NaOH then treated with $H_2SO_4$ |
| Cleaning after Chemical treatment | Filter-press to filtrate and water washing until pH about 7 |
| Mixing process | High shear mixer is used to mix SiC/$B_4C$ slurry with resin, lubricant and temporary binders |

Characteristics of the granules

| | |
|---|---|
| SiC (weight %) | 89.5% |
| Boron compound (weight %) | 0.9% $B_4C$ |

TABLE 1-continued

| | |
|---|---|
| Particles size | $D_{50}$ about 0.5 micron |
| Resin (weight %) | 5.4% phenolic resin Water miscibility 10:150 |
| Temporary binders (weight %) | 0.9% PEG 400 + 1.8% PEG1500 + 0.9% PVA |
| Lubricant (weight %) | 0.6% oil |
| Residual carbon measurement according to ANSI-B74-15-1992-R2007 | 2.0% |
| Bulk density of granules powder | 0.80 g/cc |
| Average size of the granules | 100 micrometers |
| Dispersion $B_4C$ measured by EDS and SEM on granules | Boron compound agglomerates size below 2 micrometers |

TABLE 2

Sintered ceramic product manufacturing

| | | |
|---|---|---|
| Shaping | | dry pressing |
| Sintering method | | Pressureless sintering |
| carbonizing and sintering | firing temp. (° C.) | 2110 |
| | firing atmosphere | Argon |

Sintered ceramic product characteristics

| | |
|---|---|
| density | 99.1% |
| porosity | 0.90% |
| cold bending strength 4 pts (MPa) | 575 |

EXAMPLE 2 (COMPARATIVE)

The same procedure as this previously described was implemented except that the phenolic resin which is used exhibits low water miscibility. The resin has this time a low water miscibility of 10:20, as measured according to the ISO 8989 standard.

After the granulation, still using the same procedure than previously, tiles of the same shape were shaped, sintered as dense product and finally bars tested to determine similarly their resistance to the cold bending four point strength test. The final product exhibits lower mechanical strength properties than that measured for the example 1. More precisely, the tests showed that the mechanical strength resistance is around 450 MPa with a porosity rate measured at 3%.

Scanning electron microscopy photographs on a cross section of the granules showed however agglomerates of the $B_4C$ particles with a similar size (equivalent diameter) compared to example 1.

EXAMPLE 3 (COMPARATIVE)

The same procedure as described in example 2 was implemented except that the $B_4C$ particles are not co-milled with the SiC particles. The $B_4C$ particles are added to the SiC particles during the mixing step d) together with the resin, the binder and the lubricant.

After the granulation, still using the same procedure than previously, tiles of the same shape were shaped, sintered as dense product and finally bars tested to determine similarly their resistance to the cold bending four point strength test. The product exhibits poor mechanical properties by comparison to that of example 1. More precisely, the tests showed that the mechanical strength resistance does not exceed 380 MPa for a porosity of 4%.

Scanning electron microscopy photographs on a cross section of the granules showed agglomerates of the $B_4C$ particles with a large size (equivalent diameter) higher than 10 microns, i.e. larger compared to examples 1 and 2.

EXAMPLE 4 (COMPARATIVE)

The same procedure as described in example 2 was implemented except that the average size of SiC particles during milling is reduced only to 1,5 microns instead of 0.5 microns.

After the granulation, still using the same procedure than previously, tiles of the same shape were shaped, sintered as dense product and finally bars tested to determine similarly their resistance to the cold bending four point strength test. The products exhibit even low mechanical properties by comparison to example 3. More precisely, the tests showed that the mechanical strength resistance does not exceed 280 MPa for a porosity of 6%.

Scanning electron microscopy photographs on a cross section of the granules showed agglomerates of the $B_4O$ particles with a large size (equivalent diameter) higher than 10 microns.

EXAMPLE 5 (COMPARATIVE)

The same procedure as described in example 1 was implemented except that the amount of resin was increased up to 20% of resin instead of 5.4%. The free carbon after granulation was measured at about 8% instead of 2.0% for example 1.

After the granulation, still using the same procedure than previously, tiles of the same shape were shaped, sintered as dense product and finally bars tested to determine similarly their resistance to the cold bending four point strength test. The products exhibit very low mechanical properties by comparison to example 1. More precisely, the tests showed that the mechanical strength resistance does not exceed 250 MPa for a porosity of 4%.

Scanning electron microscopy photographs on a cross section of the granules showed however agglomerates of the $B_4O$ particles with a size (equivalent diameter) lower than 2 microns.

EXAMPLE 6 (COMPARATIVE)

The same procedure as described in example 1 was implemented except that the amount of $B_4C$ was increased up to 5%, which corresponds to a content of about 4.5% by weight of $B_4C$ in the granules. After the co-milling the average particle size of the particles mixture is the same as for example 1.

After the granulation, still using the same procedure than previously, tiles of the same shape were shaped, sintered as dense product and finally bars tested to determine similarly their resistance to the cold bending four point strength test. The products exhibit a much lower mechanical properties by comparison to example 1. More precisely, the tests showed that the mechanical strength resistance does not excess 420 MPa for a porosity of 5%.

Scanning electron microscopy photographs on a cross section of the granules showed however agglomerates of the $B_4C$ particles with a size (equivalent diameter) lower than 2 microns.

EXAMPLE 7 (COMPARATIVE)

The same procedure as described in example 1 was implemented except that the amount of $B_4C$ was increased up to 10%, which corresponds to a content of about 9% by weight of $B_4C$ in the granules. After the co-milling the average particle size of the particles mixture is the same as for example 1.

After the granulation, still using the same procedure than previously, tiles of the same shape were shaped, sintered as dense product and finally bars tested to determine similarly their resistance to the cold bending four point strength test. The products exhibit a much lower mechanical properties by comparison to that of example 1. More precisely, the tests showed that the mechanical strength resistance is around 320 MPa for a porosity of 8%.

Scanning electron microscopy photographs on a cross section of the granules showed however agglomerates of the $B_4C$ particles with a size (equivalent diameter) lower than 2 microns.

EXAMPLE 8 (COMPARATIVE)

The same procedure as described in example 1 was implemented except that:
the average diameter $D_{50}$ of both starting powders is about 0.5 micrometers and
the $B_4C$ particles are not co-milled with the SiC particles.
The $B_4C$ particles are added to the SiC particles during the mixing step d) together with the resin, the binder and the lubricant and high shear mixer is used to mix the whole.

After the granulation, still using the same procedure than previously described in example 1, tiles were shaped, sintered as dense product and finally bars tested to determine similarly their resistance to the cold bending four point strength test. The product exhibits poor mechanical properties by comparison to that of example 1. More precisely, the tests showed that the mechanical strength resistance does not exceed 440 MPa for a porosity of about 1%.

Scanning electron microscopy photographs on a cross section of the granules showed agglomerates of the $B_4C$ particles with a size (equivalent diameter) of about 50 micrometres.

EXAMPLE 9 (COMPARATIVE)

The same procedure as described in example 1 was implemented except that the chemical treatment to remove the impurities and the attrition residues in the particles mixture after the co-milling step is modified so that it is first washed by the acidic solution and then neutralized by the basic solution.

The product exhibits poor mechanical properties by comparison to that of example 1. More precisely, the tests showed that the mechanical strength resistance does not exceed 480 MPa for a porosity of about 1%.

The invention claimed is:
1. A process for obtaining granules useful for the manufacture of a silicon carbide based sintered product, comprising:
   a) mixing a first powder of silicon carbide SiC particles, whose average diameter $d_{50}$ is about 2 micrometers or more than 2 micrometers with a second powder of a boron compound particles, whose average diameter $d_{50}$ is about 2 micrometers or more than 2 micrometers, the SiC particles content being more than 90% by weight of a powder mixture of the first and second powders;
   b) co-milling the powder mixture of SiC and boron compound particles until the overall average diameter $D_{50}$ of the resulting particles size is between 0.3 and 1 micrometers;
   c) chemically treating the powder mixture at least by base solution and then by acid wash;
   d) mixing the powder mixture coming from step c) with 1 to 10% by weight, based upon the silicon carbide con- tent, of a carbon containing resin having a water miscibility of more than 10:50, as measured according to the ISO8989 standard, and e) spray-drying the resulting mixture from step d), so as to generate said granules.

2. The process as claimed in claim 1, wherein the chemically treating is performed under basic followed by acidic conditions so as to remove the impurity contents incurred by the raw materials and co-milling and so that the total amount of impurities silicon metal (Si); silica ($SiO_2$); iron (Fe) and aluminum (Al) is less than 2% by weight, based upon the silicon carbide content.

3. The process as claimed in claim 1, wherein the carbon containing resin has a water miscibility, measured according to the ISO8989 standard, of more than 10:100.

4. The process as claimed in claim 1, wherein the average diameter of the particles of the first SiC powder and the second boron compound are both between 3 and 30 micrometers.

5. The process as claimed in claim 1, wherein the boron compound is a boron carbide $B_4C$.

6. The process as claimed in claim 1, wherein step b) for co-milling is performed under conditions allowing the overall average diameter $d_{50}$ of the resulting particles to be about 0.5 micrometers.

7. The process as claimed in claim 1, wherein the carbon containing resin used in step d) is a phenolic resin.

8. The process as claimed in claim 1, wherein the mixing of the powder mixture at step d) includes mixing with a temporary binder, the temporary binder chosen amongst the polyvinyl alcohol, acrylic resin, stearic acid, mono-ethylene glycol, polyethylene glycol, the concentration of the temporary binder being in the range of 0.5% to 8% by weight, based upon the silicon carbide content.

9. A composite granule which can be obtained by a process according to claim 1, formed by an inorganic part comprising essentially silicon carbide particles and boron carbide particles and by an organic part comprising at least a carbon containing resin, the inorganic particles being scattered in said resin, said granules having the following features:
- an average size of between 20 to 2000 micrometers,
- a silicon carbide (SiC) content of more than 80% by weight, and less than 99%,
- a free carbon content of at most 3% by weight,
- a boron content of between 0.5 to 3% by weight,
- said boron being scattered in the granules so that the boron compound arises within the resin as agglomerates whose equivalent diameter is at most 5 micrometers.

10. The composite granule as claimed in claim 9, wherein the silicon carbide (SiC) content is more than 88% by weight and less than 92% by weight.

11. The composite granule as claimed in claim 9, wherein the free carbon content is less than 2.5% by weight.

12. The composite granule as claimed in claim 9, wherein the equivalent diameter of the boron compound agglomerates is less than 3 micrometers.

13. The composite granule as claimed in claim 9, wherein the carbon containing resin is a phenolic resin.

14. A process for the manufacture of a silicon carbide based sintered product with a high mechanical strength, comprising:
- shaping the granules according to claim 9, said shaping being performed in such a manner as to form a body with desired shapes,
- carbonizing the organic part,
- pressureless sintering, under a non-oxidizing atmosphere, the granules, at a temperature in the range between 2000° C. and 2400° C.

15. A silicon carbide based sintered product obtainable by the pressureless sintering of the shaped previous granules according to claim 9, wherein a mechanical strength is higher or equal to 500 MPa, as measured using a cold bending four point strength test according to the ASTM C1161-02.c standard.

16. The process as claimed in claim 1, wherein the mixing in step d) is carried out with a temporary binder and optionally a lubricant.

17. The process as claimed in claim 7, wherein the carbon containing resin used in step d) is a resol phenolic resin.

18. The composite granule as claimed in claim 9, wherein the average size of the granules is between 50 to 1000 micrometers.

19. The composite granule as claimed in claim 18, wherein the average size of the granules is between 80 to 300 micrometers.

20. The composite granule as claimed in claim 9, wherein the free carbon content is at most 2.5% by weight.

21. The composite granule as claimed in claim 13, wherein the phenolic resin is a resol phenolic resin.

22. The process as claimed in claim 14, wherein the carbonizing is performed under no-oxidizing atmosphere and at a temperature lower than 1000° C.

23. The process as claimed in claim 22, wherein the carbonizing is performed under argon.

24. A process for obtaining granules useful for the manufacture of a silicon carbide based sintered product, comprising:
- co-milling a powder mixture of a first powder of silicon carbide SiC particles and of a second powder of boron compound particles, the silicon carbide SiC particles and the boron compound particles having an average diameter $d_{50}$ of at least about 2 micrometers, the SiC particles content being more than 90% by weight of the powder mixture, the co-milling of the powder mixture carried out until an overall average diameter $D_{50}$ of the resulting co-milled particles is between 0.3 and 1 micrometers;
- chemically treating the powder mixture by base solution and by acid wash;
- mixing the chemically treated powder mixture with 1 to 10% by weight, based upon the silicon carbide content, of a carbon containing resin having a water miscibility of more than 10:50, as measured according to the ISO8989 standard, to form a resulting mixture, and
- spray-drying the resulting mixture so as to generate said granules.

* * * * *